United States Patent
Kretschmann et al.

(10) Patent No.: US 11,990,834 B2
(45) Date of Patent: May 21, 2024

(54) METHOD FOR PHASE-SEPARATED OVERCURRENT PROTECTION OF A THREE-PHASE BRIDGE CIRCUIT

(71) Applicants: Jörg Kretschmann, Kempen (DE); Stephan Engelhardt, Sonsbeck (DE)

(72) Inventors: Jörg Kretschmann, Kempen (DE); Stephan Engelhardt, Sonsbeck (DE)

(73) Assignee: KK Wind Solutions A/S, Ikast (DK)

( * ) Notice: Subject to any disclaimer, the term of this patent is extended or adjusted under 35 U.S.C. 154(b) by 128 days.

(21) Appl. No.: 17/863,064

(22) Filed: Jul. 12, 2022

(65) Prior Publication Data
US 2022/0345030 A1 Oct. 27, 2022

Related U.S. Application Data

(63) Continuation of application No. PCT/EP2021/050422, filed on Jan. 12, 2021.

(30) Foreign Application Priority Data

Jan. 13, 2020 (EP) .................................... 20151516

(51) Int. Cl.
*H02M 1/32* (2007.01)
*H02J 3/00* (2006.01)
(Continued)

(52) U.S. Cl.
CPC .......... *H02M 1/325* (2021.05); *H02J 3/0012* (2020.01); *H02J 3/32* (2013.01); *H02J 3/381* (2013.01);
(Continued)

(58) Field of Classification Search
CPC .. H02M 1/325; H02M 7/5387; H02M 1/0009; H02J 3/381; H02J 3/32; H02J 3/0012; H02J 2300/24; H02J 2300/28
See application file for complete search history.

(56) References Cited

U.S. PATENT DOCUMENTS 8,618,456 B2 * 12/2013 Hinman ............... H02H 7/1222
 307/45
11,267,503 B2 * 3/2022 Mori ....................... H02P 27/08
(Continued)

FOREIGN PATENT DOCUMENTS

DE 10 2009 045351 A1 4/2011
DE 10 2015 205627 A1 10/2015
(Continued)

OTHER PUBLICATIONS

Zhang et al., "Survey on Fault-Tolerant Techniques for Power Electronic Converters", *IEEE Transactions on Power Electronics, Institute of Electrical and Electronics Engineers* (Journal), USA, vol. 29, No. 12, Dec. 1, 2014, pp. 6319-6331, DOI: 10.1109/TPEL.2014.2304561.

(Continued)

*Primary Examiner* — Jared Fureman
*Assistant Examiner* — Esayas G Yeshaw
(74) *Attorney, Agent, or Firm* — Reinhart Boerner Van Deuren P.C.

(57) ABSTRACT

Disclosed is a method for operating a three-phase inverter on a three-phase load. The three-phase inverter has a direct voltage intermediate circuit, at least one three-phase bridge circuit, and at least one control unit for controlling the bridge circuit. In the at least one bridge circuit, at least two power switches per phase are provided, which are connected in series parallel to the direct voltage intermediate circuit. Depending on predefined target voltage values of the three phases of the inverter, the power switches of each individual phase are actuated via the control unit such that a three-phase alternating voltage is generated on the three-phase load via switching operations of the power switches. Very good dynamic control behaviour can be achieved despite (Continued)

cost-effective dimensioning of the IGBT power switches of the three-phase bridge circuit.

13 Claims, 5 Drawing Sheets

(51) Int. Cl.
    *H02J 3/32*     (2006.01)
    *H02J 3/38*     (2006.01)
    *H02M 1/00*     (2006.01)
    *H02M 7/5387*     (2007.01)

(52) U.S. Cl.
    CPC ....... *H02M 1/0009* (2021.05); *H02M 7/5387* (2013.01); *H02J 2300/24* (2020.01); *H02J 2300/28* (2020.01)

(56) References Cited

U.S. PATENT DOCUMENTS

| | | | |
|---|---|---|---|
| 11,711,040 B2* | 7/2023 | Toyodome | H02P 21/22 318/400.02 |
| 2007/0086226 A1 | 4/2007 | Mavier et al. | |
| 2011/0273917 A1* | 11/2011 | Maitra | H02J 3/46 363/74 |
| 2017/0279394 A1* | 9/2017 | Miura | H02P 6/10 |
| 2020/0389118 A1* | 12/2020 | Kashihara | H02M 7/53871 |
| 2021/0111658 A1* | 4/2021 | Miyake | H02M 1/12 |
| 2022/0200508 A1* | 6/2022 | Saha | H02P 21/22 |
| 2022/0345030 A1* | 10/2022 | Kretschmann | H02M 7/5387 |

FOREIGN PATENT DOCUMENTS

| | | |
|---|---|---|
| EP | 1 152 520 A2 | 11/2001 |
| EP | 2 830 175 A2 | 1/2015 |

OTHER PUBLICATIONS

Meyer et al., "Fault ride through control of medium-voltage converters with LCL filter in distributed generation systems", *2013 IEEE Energy Conversion Congress and Exposition* (Journal), IEEE, Sep. 15, 2013, pp. 1954-1961, DOI: 10.1109/ECCE.2013.6646947.

Alepuz et al: "Control Strategies Based on Symmetrical Components for Grid Connected Converters Under Voltage Dips", *IEEE Transactions on Industrial Electronics* (Journal), IEEE Service Center, Piscataway, NJ, USA, vol. 56, No. 6, Jun. 1, 2009, pp. 2162-2173, DOI: 10.1109/TIE.2009.2017102.

"Raumzeigermodulation", *WIKIPEDIA* (Website), Sep. 3, 2018, 10 pages. URL:https://de.wikipedia.org/w/index.php?title=Raumzeigermodulation&oldid=180605807.

* cited by examiner

METHOD FOR PHASE-SEPARATED OVERCURRENT PROTECTION OF A THREE-PHASE BRIDGE CIRCUIT

CROSS-REFERENCE TO RELATED PATENT APPLICATIONS

This patent application is a continuation of International Application No. PCT/EP2021/050422, filed on Jan. 12, 2021, which claims the benefit of priority to European Patent Application No. 20151516.0, filed Jan. 13, 2020, the entire teachings and disclosures of both applications are incorporated herein by reference thereto.

FIELD

The invention relates to a method for operating a three-phase inverter on a three-phase load, in particular on an electrical grid, wherein the three-phase inverter has a direct voltage intermediate circuit, at least one three-phase bridge circuit and at least one control unit for controlling the bridge circuit, wherein, in the at least one bridge circuit, at least two power switches per phase are provided, which are in series connected to the direct voltage intermediate circuit, wherein in the method, depending on the predefined target voltage values of the three phases of the inverter, the power switches of each individual phase are actuated via the control unit such that a three-phase alternating voltage is generated on the three-phase load via switching operations of the power switches. In addition, the invention relates to a device for generating a three-phase alternating voltage on a three-phase load or on an electrical grid with at least one three-phase inverter and a direct voltage intermediate circuit, wherein the inverter has at least one three-phase bridge circuit and at least one control unit for controlling the bridge circuit, wherein, in the at least one bridge circuit, at least two power switches per phase are provided, which are in series connected to the direct voltage intermediate circuit, wherein the device is configured to actuate the power switches of each individual phase via the control unit depending on predefined target voltage values for all three phases of the inverter such that an alternating voltage is generated via switching operations of the power switches.

BACKGROUND

Three-phase inverters are used to generate, from a direct voltage, a specific alternating voltage, which are used to operate an electrical load, for example a motor, or to feed electrical energy into a three-phase electrical grid. The bridge circuit used in the inverter usually has two power switches per phase such that typically 6 power switches are used to generate an alternating voltage with three phases. The power switches can be implemented with IGBT power switches, which optionally have a freewheeling diode connected in anti-parallel thereto. However, other power switches can also be used here. A bridge circuit known correspondingly from the prior art is represented in FIG. 1.

The costs for three-phase inverters, in particular for higher power classes, are primarily determined by the necessary power electronics, i.e. for example by the required IGBTs or IGBT modules. IGBTs are particularly fast power switches and have very good dynamic properties for use in the inverter. The power switches are dimensioned in relation to the maximum currents that can be switched without damaging the IGBT, i.e. the IGBTs are designed for corresponding maximum currents. If the currents to be switched continuously or briefly exceed the maximum currents, the corresponding power switch or IGBT is switched off in order to prevent the IGBT being damaged or destroyed due to an overload.

However, the power switches of a three-phase inverter are selected not only with regard to the continuous operation of the inverter, but also with regard to brief power peaks, which must also be provided regularly via three-phase inverters. In the case of grid voltage faults, very large currents often occur in three-phase inverters operated on electrical grids, which can lead to overloading of individual IGBTs. It is known from the prior art to completely lock the IGBTs of the bridge circuit of the inverter in such a case as soon as overload states, such as for example an overcurrent above a switch-off limit of an IGBT, occur in one of the power switches of a phase. The current then only flows via the freewheeling diodes connected in anti-parallel to the IGBTs, which in the power switches used today can carry a briefly higher current than the IGBTs. This is part of a protection concept to protect all power switches of the bridge circuit of the inverter from damage.

An inverter whose bridge circuit is completely switched off in the event of a fault is known from the European patent application EP 2 830 175 A2. The European patent application EP 1 152 520 A2, on the other hand, deals with the control of a three-phase inverter dependent on an input direct current.

For example, a method for operating an inverter is known from US 2007/0086226 A1, in which an additional power switch is switched on if a malfunction is detected in a power switch of the three phases.

In the article "Survey on Fault-Tolerant Techniques for Power Electronic Converters", IEEE Transaction on Power Electronics, Zhang Wenping et al., Vol. 29, No. 12, 1 Dec. 2014, the use of additional power switches, for example in the form of TRIACS, is proposed for a fault redundant topology.

However, both redundant topologies lead to a significant increase in costs for power switches with a high switching capacity.

Concepts for traversing grid fault states are known from the article "Fault Ride Through Control of Medium-Voltage Converters with LCL Filter in Distributed Generation Systems", Robert Meyer et al., IEEE Energy Conversion Congress and Exposition, IEEEE, 15 Sep. 2013, pages 1954-1961. The resulting overload states in individual phase arms of the inverter are not discussed.

Three-phase inverters are known from the German patent applications DE 10 2015 205 627 A1 and DE 10 2009 045 351 A1 which, in the event of a fault in one phase, can continue to operate the three-phase bridge circuit with the remaining two phases.

Instead of an IGBT with a freewheeling diode, other power switches consisting of an actively switchable power semiconductor and a parallel-switched reverse-conducting passive power semiconductor can also be used, for example. The reverse-conducting state then denotes the current flow through the freewheeling diode in its forward direction or the current flow in the forward direction of the passive power semiconductor.

However, it is problematic if high control dynamics are required at the same time during the overload state. Grid codes, for example, regularly require grid operators to feed a maximum reactive current within a very short time from the inverter to the grid in the event of a drop in grid voltage in order to support the grid voltage. Since the currents that then occur depend on the drop in grid voltage itself, overload states can regularly occur in individual phases of the bridge circuit such that the bridge circuit in the inverter is switched off and protected. At the same time, however, a high level of control dynamics is requested by the control device of the inverter in order to comply with the grid codes. However, while the bridge circuit is switched off, the control device cannot influence the inverter such that the dynamic control behaviour of the inverter is impaired. To avoid switching off, power switches dimensioned for correspondingly high power must be provided, which do not require the bridge circuit to be switched off even in the event of a drop in grid voltage, for example. However, this increases the costs of the inverters.

FIG. 3 shows, for example, simulated reactive current outputs of two inverters in the case of a simulated drop in grid voltage with differently dimensioned power switches. The 20 ms moving average values of the reactive current at a grid frequency of 50 Hz according to IEC 61400-21 are shown. The target reactive current output is denoted on the Y-axis with the value 1.0. A typically permitted corridor of 90% to 110% of reactive current output is represented by two axes parallel to the X-axis. The time is shown on the X-axis, whereby the drop in voltage has been simulated at t=0.30 s.

Curve A shows the simulated behaviour of an inverter in which the power switches have been selected such that they do not have any overload states even in the event of a drop in grid voltage. Curve B shows the behaviour of a three-phase inverter with power switches dimensioned to be smaller. While adjusting the reactive current output, two phases are briefly overloaded and the bridge circuit of the inverter is briefly locked. In curve A, the permitted corridor of the reactive current output is already reached at t=0.39 s. However, the disadvantage is that the costs of the IGBT power switches are relatively high, as they have been dimensioned for the drop in grid voltage.

Usually, the power switches or IGBTs are selected such that the overcurrent protection measures can be triggered in such exceptional cases such that the costs for the IGBT power switches can be reduced. However, due to the triggering of the overcurrent protection of individual IGBT power switches, the entire bridge circuit is locked by the control unit, which leads to worse dynamic control behaviour of the bridge circuit. As can be seen in FIG. 3, curve B only reaches the permitted reactive current output corridor with significant overshoot at roughly t=0.41 s and thus later than curve A. If the IGBTs are dimensioned more cost-effectively, cost advantages are therefore achieved, but these result in a disadvantageous dynamic behaviour of the bridge circuit in the event of overcurrents.

BRIEF SUMMARY

The invention proceeds from this problem and has the object of providing a method for operating a three-phase inverter on a three-phase load, in particular on an electrical grid, with which a very good dynamic control behaviour can be achieved despite cost-effective dimensioning of the IGBT power switches of the three-phase bridge circuit. Furthermore, the object underlying the present invention is to provide a corresponding, generic device for generating a three-phase alternating voltage on a three-phase load or on an electrical grid with at least one three-phase inverter, which has significantly improved dynamic control behaviour at lower costs, in particular in the case of grid voltage faults.

According to a first teaching of the present invention, the above-mentioned object is achieved by a method for operating a three-phase inverter in that a monitoring of the individual phases for an overload state is carried out using monitoring means, wherein if an overload state is detected in one or two phases of the three-phase inverter, the bridge circuit continues to be operated with one or two non-overloaded phases at least for the duration of the detected overload state, wherein, instead of the predefined target voltage values, modified target voltage values are determined at least for the duration of the overload state, which are used to control the bridge circuit and, in order to determine the modified target voltage values, the predefined target voltage values of the three phases are transformed into a predefined target voltage rotating phasor in the $\alpha\beta$-coordinate system, the target voltage rotating phasor is decomposed into a differential voltage rotating phasor and at least one modified target voltage rotating phasor in the $\alpha\beta$-coordinate system, wherein the at least one modified target voltage rotating phasor in the overloaded phases takes into account in each case the resulting maximum phase voltage and from the modified target voltage rotating phasor in the $\alpha\beta$-coordinate system, the modified target voltage values can be determined.

It has shown that the continued operation of a three-phase bridge circuit is possible despite overload in one or two phases, without causing damage to the power switches, in that only the IGBTs in the non-overloaded phases of the bridge circuit continue to be operated and, in the overloaded phases, the current flows, for example, via freewheeling diodes. As a result, the dynamic control behaviour of the bridge circuit can already be improved compared to completely switching off the bridge circuit in the event of overload.

According to the invention, instead of the predefined target voltage values, modified target voltage values are determined at least for the duration of the overload state, which are used to control the bridge circuit. This makes it possible to maintain controllability of the three-phase bridge circuit and to set advantageous switching states despite an overload of one or two phases of the bridge circuit. Using the modified target voltage values, the dynamic control behaviour can be significantly improved in the event of overload states of one or two phases compared to switching off the entire bridge circuit. In addition, it results that the power dimensioning of the power switches can be reduced by 10% to 15% without significant losses in control behaviour.

According to the invention, in order to determine the modified target voltage values, the predefined target voltage values of the three phases are transformed into a predefined target voltage rotating phasor in the $\alpha\beta$-coordinate system, the target voltage rotating phasor is decomposed into a differential voltage rotating phasor and a modified target voltage rotating phasor in the $\alpha\beta$-coordinate system, wherein the at least one modified target voltage rotating phasor in the overloaded phases takes into account in each case the resulting maximum phase voltages and from the resulting, modified target voltage rotating phasor in the $\alpha\beta$-coordinate system, the modified target voltage values for the phases can be determined.

In the $\alpha\beta$-coordinate system, by simply decomposing the predefined target voltage rotating phasor into a differential voltage rotating phasor and a modified target voltage rotating phasor, a modified target voltage rotating phasor can be determined, from which in turn the modified target voltage values of the individual phases of the bridge circuit can be determined. By targets for the differential voltage rotating phasor, the modified target voltage rotating phasor and thus the actuation of the bridge circuit can be easily varied and optimised by the control unit in the event of overload.

Alternatively, according to a further configuration of the method according to the invention, the modified target voltage rotating phasor in the αβ-coordinate system can be used directly by the control unit of the bridge circuit without determining the modified target voltage values for all three phases. For this purpose, the control unit only needs to be able to use target voltage rotating phasors in the αβ-coordinate system to actuate the bridge circuit.

According to one configuration of the method according to the invention, the overload state of a phase is detected by the monitoring means when a predetermined current in the relevant phase or a predetermined temperature of a component of the relevant phase, preferably of a power switch or of a freewheeling diode, is exceeded. Manufacturers of power semiconductors usually specify values for the maximum permissible current and the maximum permissible barrier junction temperature of the power switches or freewheeling diodes. If these values are exceeded, there is a risk of the component being destroyed by thermal overload. Therefore, the current and the temperature are preferred variables to detect an overload and take measures to avoid it.

If during the monitoring of the individual phases of the bridge circuit, the maximum phase voltage resulting during the respective overload, for example across the freewheeling diode, is determined and used as a modified target voltage value for the overloaded phase, the modified target voltage value for the overloaded phase can be calculated simply by determining the overload and the respective sign of the overload voltage. The maximum phase voltage is ⅔ of the direct voltage of the intermediate circuit or −⅔ of the direct voltage of the intermediate circuit depending on the direction of current during the overload. If the modified target voltage values for the overloaded phases are definite, the modified target voltage values for the non-overloaded phases can be used to optimise the control behaviour.

According to a further configuration of the method according to the invention, modified target voltage values for the at least one non-overloaded phase are determined for at least one non-overloaded phase taking into account the predefined target voltage values for three phases and the modified target voltage values for at least one overloaded phase. When taking into account the predefined target voltage value for three phases and the modified target voltage values for at least one overloaded phase, the modified target voltage values for the at least one non-overloaded phase can be used to optimise the modified target voltage values to be switched in the event of overload, resulting in optimised control behaviour.

According to a further configuration of the method according to the invention, the absolute value of the differential voltage rotating phasor has a predetermined value. This predetermined value does not necessarily have to be constant over time, but can, for example, be dependent on the respective position of the predefined target voltage rotating phasor. This can also influence the dynamic control behaviour.

It is particularly advantageous if the absolute value of the differential voltage rotating phasor according to a further configuration is selected to be as small as possible. A minimum absolute value of a differential voltage rotating phasor means that the selected modified target voltage rotating phasor has a minimum distance to the originally predefined target voltage rotating phasor. This can optimise the transient oscillation behaviour of the bridge circuit.

According to a further configuration of the method, the absolute value of the differential voltage rotating phasor at least temporarily has the value zero. In this case, on the basis of the remaining, non-overloaded phases, the predefined target voltage rotating phasor can be fully reconstructed at least temporarily by the remaining switching states of the non-overloaded phases and thus at least temporarily an identical three-phase alternating voltage can be generated at the inverter despite overload.

If IGBTs with at least one freewheeling diode connected in anti-parallel thereto are used as power switches in the bridge circuit, the bridge circuit of the inverter can be designed to be particularly robust, since the overload current can flow via the freewheeling diodes in the event of overload.

The method is particularly preferably carried out with three-phase inverters of devices for generating and feeding electrical energy into an electrical grid, preferably with three-phase inverters of wind power systems, of photovoltaic systems with or without electrical storage devices or of components for storing electrical energy, in particular of battery storage systems, which are operated on the electrical grid. It has shown that the method according to the invention makes it possible to dimension the power switches to be smaller and still achieve very good control behaviour.

For this reason, according to a further configuration of the method, the method is preferably carried out during a grid voltage fault, preferably in the fault ride through (FRT) operation of the inverter. In this FRT operation in particular, overloads of individual phases of the bridge circuits used often occur, which previously significantly impaired the control behaviour of the bridge circuit. Using the method according to the invention, a control behaviour can thus be provided with power switches of lower power, which was previously only achievable with power switches dimensioned to be larger. At the same time, using the method according to the invention, requirements of the grid operators can be met at lower costs despite smaller dimensioning of the power switches.

The above-mentioned object is achieved by a generic device for generating a three-phase alternating voltage on a three-phase load or on an electrical grid with at least one three-phase inverter in that means for monitoring the individual phases for an overload state are provided, which are configured to continue to operate the bridge circuit, in the case of an overload state in one or two phases of the three-phase inverters, with one or two non-overloaded phases at least for the duration of the detected overload state, and the means are configured to determine, instead of the predefined target voltage values, modified target voltage values at least for the duration of the overload state, which are used to control the bridge circuit and the means are also configured, in order to determine the modified target voltage values, to transform the predefined target voltage values of the three phases into a predefined target voltage rotating phasor in the αβ-coordinate system, to decompose the target voltage rotating phasor into a differential voltage rotating phasor and at least one modified target voltage rotating phasor in the αβ-coordinate system, wherein the at least one modified target voltage rotating phasor in the overloaded phases takes into account in each case the resulting maximum phase voltage and from the modified target voltage rotating phasor in the αβ-coordinate system, the modified target voltage values can be determined.

In contrast to the devices that previously locked the entire bridge circuit in the event of overload, an improved control behaviour of the bridge circuit in the event of overload already results through the continued operation with non-overloaded phases. Using the modified target voltage rotating phasor, the actuation of the bridge circuit of the device can be easily varied and optimised by the control unit in the event of overload.

According to a first configuration of the device, the means for monitoring the individual phases for an overload state are preferably configured to determine, instead of predefined target voltage values, modified target voltage values and to use the modified target voltage values for controlling the bridge circuit. As previously explained, the bridge circuit can continue to operate despite overload in one or two phases of the bridge circuit by providing modified target voltage values for the control unit and thus can provide improved dynamic behaviour of the device in the event of overload at a lower cost for the power switches. The use of modified target voltage values makes it possible to set a desired, for example optimised control behaviour of the grid-side reactive current.

Finally, the device is preferably a wind power system operated on an electrical grid, a photovoltaic system with or without a storage device or a component operated on the grid for storing electrical energy, for example a battery storage system. The wind power system can have a full-scale inverter or a double-fed asynchronous machine with a partial inverter. The aforementioned devices all have inverters with bridge circuits and can, at reduced costs, provide an improved dynamic control behaviour, in particular in the event of grid voltage faults.

BRIEF DESCRIPTION OF THE DRAWINGS

The invention will now be explained in more detail using exemplary embodiments in conjunction with the drawings. The drawings show.

DETAILED DESCRIPTION

Figure 1:
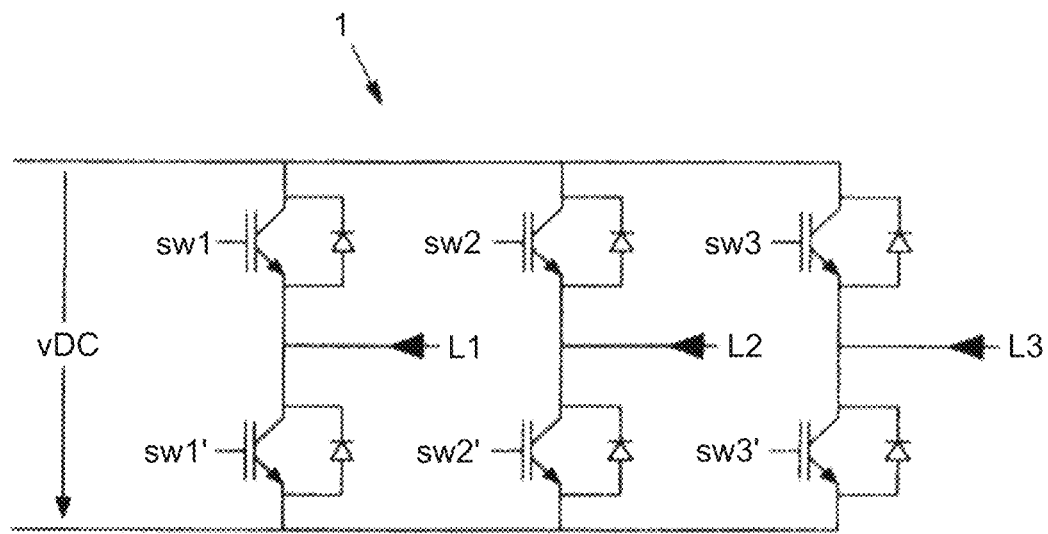
FIG. 1 depicts the structure of a three-phase bridge circuit from the prior art.

At first, FIG. 1 shows the bridge circuit 1 known from the prior art, which has the power switches sw1, sw2, sw3, sw1', sw2' and sw3' assigned to the corresponding phases L1, L2 and L3. The power switches of one phase, for example sw1 and sw1', are arranged in series with the direct voltage intermediate circuit VDc. The same applies to the power switches sw2 and sw2' and sw3 and sw3' assigned to the phases L2 and L3. The aforementioned power switches, which are implemented here as IGBT power switches with freewheeling diodes connected in anti-parallel thereto, can be used to generate a defined, three-phase alternating voltage across the phases L1, L2 and L3.

Figure 2:
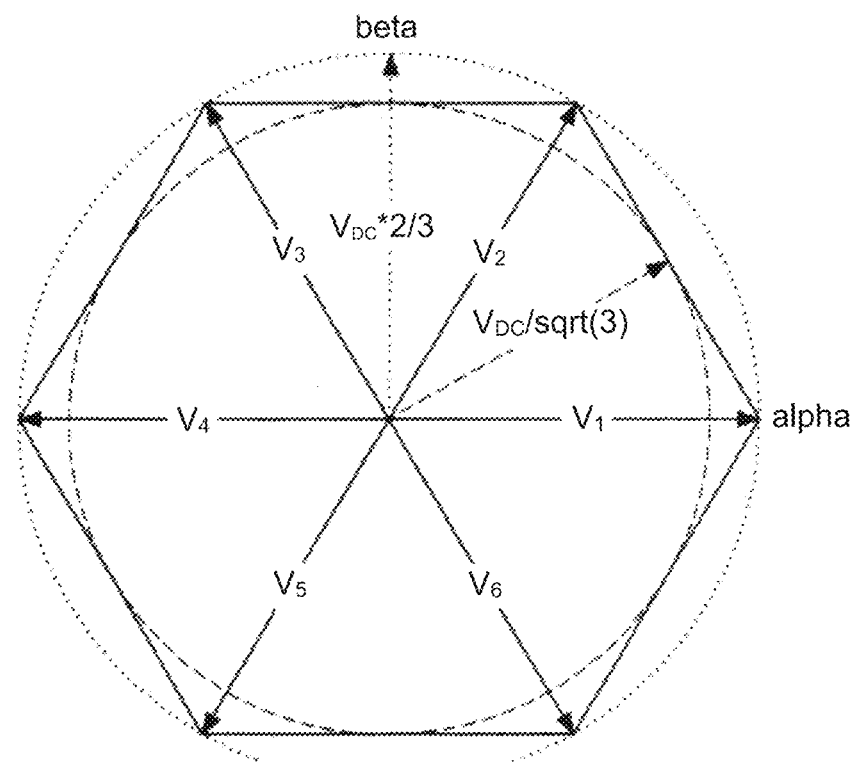
FIG. 2 depicts, in an $\alpha\beta$-coordinate system, the possible switching phasors of the bridge circuit from FIG. 1

FIG. 2 now shows the switching phasors that can be generated by the bridge circuit in the $\alpha\beta$-coordinate system. Since the six power switches can only be switched in a binary manner, the bridge circuit 1 can only attain the discrete switching phasors represented in FIG. 2. A total of 8 switching phasors V0 to V7 can be switched. The states V0 and V7 are, however, not represented in the phasor diagram of FIG. 2, as these result in zero vectors. Different voltage values can be switched on the three phases L1, L2, L3 via the switching phasors V1 to V6. The control unit of the inverter (not represented here) performs the switching of the different, discrete switching phasors of the bridge circuit 1. For this purpose, the control unit of the inverter requires, for example, predefined target voltage values of the individual phases v1, v2, v3 as the input variable. However, this input variable can also be transferred to the control unit via a target voltage rotating phasor in the $\alpha\beta$-coordinate system. The control unit controls the bridge circuit, for example, by using known modulation methods, for example a pulse width modulation method.

Figure 3:
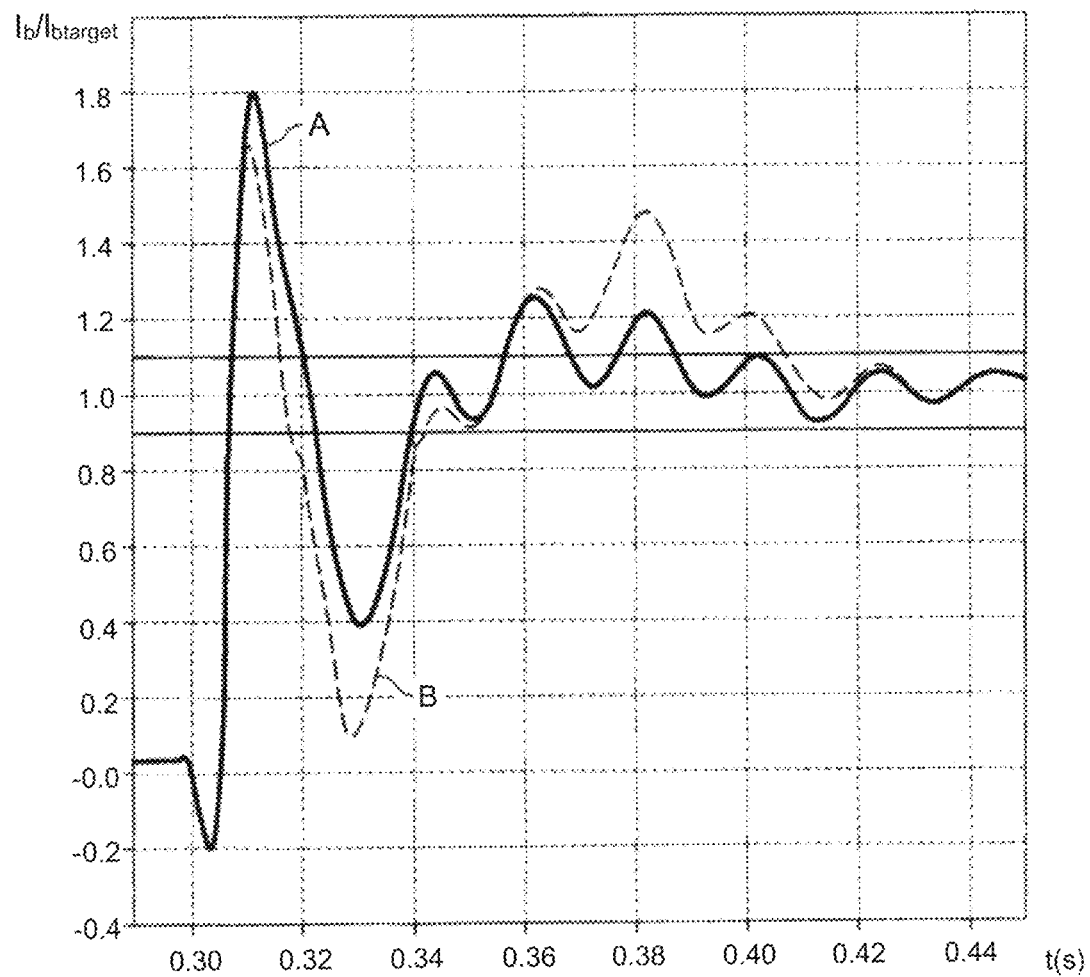
FIG. 3 depicts a diagram of a simulated reactive current output of two different three-phase inverters according to the prior art.

In FIG. 3, a simulated reactive current output of two different, three-phase inverters according to the prior art is now represented in a diagram. While curve A has a very good transient oscillation behaviour with low overshoot, curve B shows an impaired transient oscillation behaviour upon the request of a reactive current output in response to a drop in grid voltage. The reason for this is that the IGBT power switches in curve A have been dimensioned such that no overload states occur even in the event of a drop in grid voltage. Curve B shows the control behaviour of a more cost-effective bridge circuit, in which the IGBT power switches have been dimensioned such that in the event of the simulated drop in grid voltage, in the fault ride through (FRT) operation, two phases are overloaded and the bridge circuit is briefly switched off due to overload states. The poorer transient oscillation behaviour of the more cost-effective variant can be clearly seen.

Figure 4:
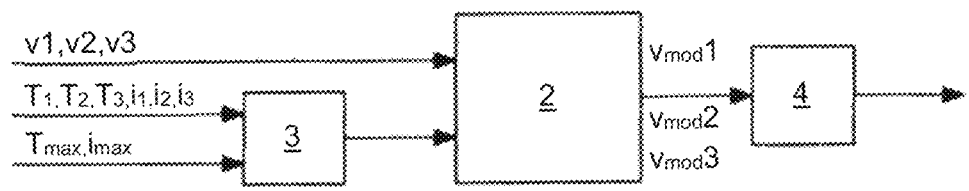
FIG. 4 depicts a block diagram of an exemplary embodiment of the method according to the invention.

An exemplary embodiment of a method according to the invention for operating a three-phase inverter, in which improved control behaviour in the event of overload states of individual phases is also achieved with cost-effectively dimensioned power switches of a bridge circuit, is represented in FIG. 4.

FIG. 4 first shows the predefined target voltage values v1, v2, v3, which are transferred from a control device to the circuit block 2. In addition, means 3 for monitoring the phases of the bridge circuit 1 are provided, which can detect overload of one or more phases. In the exemplary embodiment represented, they respond, for example, to transmitted temperature values T or phase currents i1, i2, i3, which are compared, in the exemplary embodiment represented, with the maximum permitted values $T_{max}$ and $i_{max}$ in order to detect an overload state. The input variables of the monitoring means can be selected virtually arbitrarily, provided that they allow a detection of an overload state of a phase L1, L2, L3.

If no overload is detected, the predefined target voltage values v1, v2 and v3 are transferred unchanged from the circuit block 2 to the control unit 4 (not represented in FIG. 4). The control unit 4 then actuates the power switches sw1 to sw3' of the bridge circuit 1 based on the predefined target voltage values by means of known methods, for example a pulse width modulation method (PWM).

If an overload state is detected in one or two phases of the three-phase inverter, according to the exemplary embodiment in FIG. 4, at least for the duration of the detected overload state, the bridge circuit continues to operate with one or two non-overloaded phases. This can already influence the control behaviour of the bridge circuit. If according to a configuration of the method, modified target voltage values vmod1, vmod2 and vmod3 are determined and used to control the bridge circuit instead of the predefined target voltage values v1, v2, v3 in the event of overload, the control behaviour can be further improved.

In the exemplary embodiment in FIG. 4, the voltage values vmod1, vmod2 and vmod3 are transferred from circuit block 2 to the control unit 4 as modified target voltage values of the individual phases L1, L2 and L3. In contrast to the prior art, the transmission of modified target voltage values makes it possible to continue to operate the bridge circuit 1 taking into account further specifications, for example optimised control behaviour. The modified target voltage values are, for example, target voltage values that have been changed with regard to an improved control behaviour, compared to the target voltage values v1, v2 and v3 predefined by the control device.

In order to take into account the overload state of the individual phases L1, L2, L3 of the bridge circuit 1 particularly easily, during monitoring of the individual phases of the bridge circuit, the phase voltage resulting during the respective overload is determined and used as a modified target voltage value for the overloaded phases. The phase voltage resulting at an overloaded phase corresponds to the maximum phase voltage, which corresponds to ⅔ VDc or −⅔ VDc. With this simple modification of the target voltage values, the power switches can continue to be operated with modified target voltage values vmod1, vmod2 and vmod3.

At the same time, by taking into account the phase voltage resulting at the overloaded phases when determining the modified target voltage values, it is possible to use the remaining target voltage values of the non-overloaded phases in order to predefine a modified target voltage value for the non-overloaded phases which represents a particularly good control behaviour of the bridge circuit in the overloaded state. Thereby, only overloads in one or a maximum of two phases can be taken into account. On the other hand, if all three phases are overloaded, the IGBTs of the bridge circuit are completely switched off.

By specifying the modified target voltage values vmod1, vmod2, vmod3 of the at least one non-overloaded phase, an additional degree of freedom results in comparison to the prior art, whereby the control behaviour of the bridge circuit can be targetedly improved.

In order to determine modified target voltage values vmod1, vmod2, vmod3, which allow better control behaviour of the bridge circuit in the event of overloads occurring, according to a preferred embodiment, in order to determine the modified target voltage values, the predefined target voltage values of the three phases are transformed into a predefined target voltage rotating phasor $V_{target}$ in the αβ-coordinate system.

Figure 5:
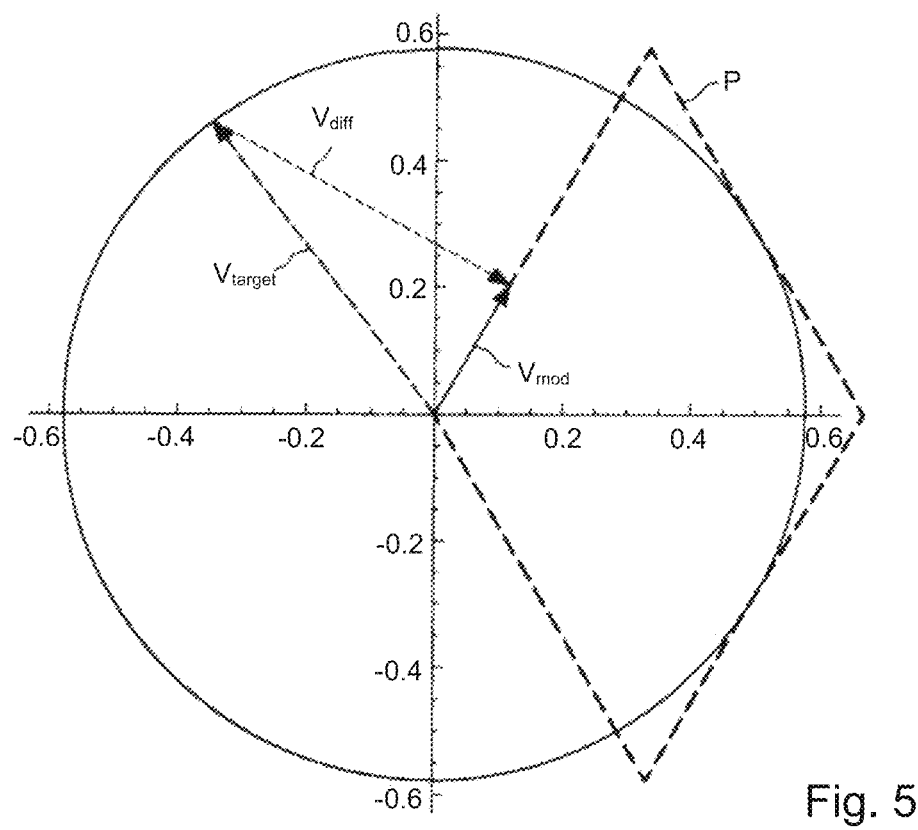
FIG. 5 depicts an exemplary embodiment for the decomposition of the target voltage rotating phasor into a differential voltage rotating phasor and a modified target voltage rotating phasor when one phase is overloaded.
Figure 6:
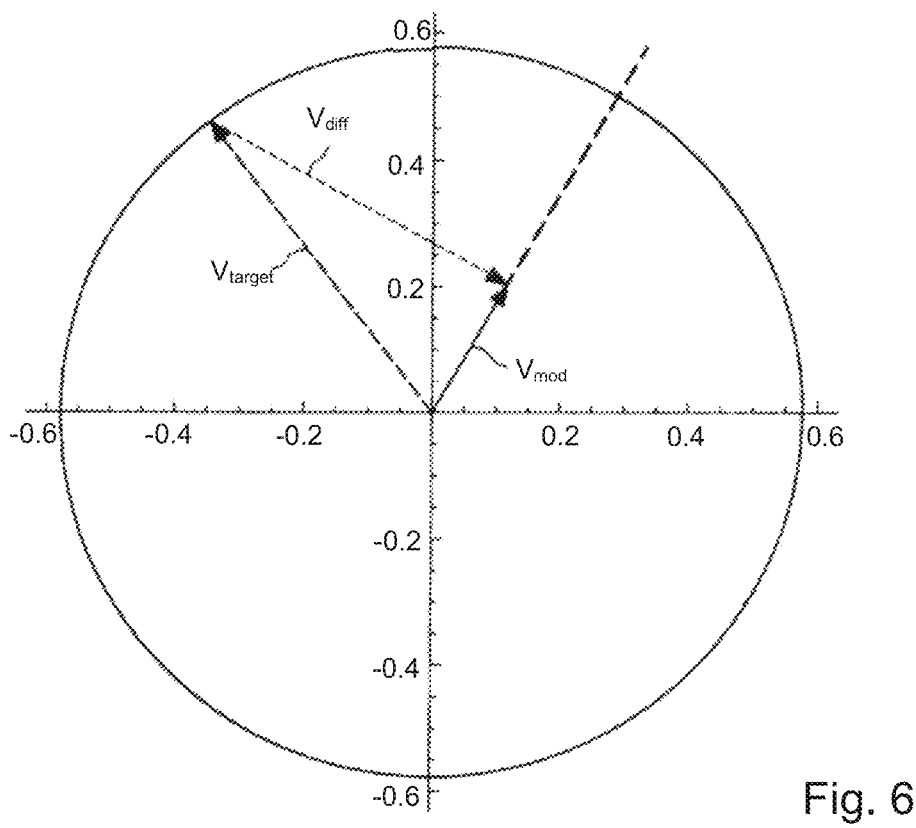
FIG. 6 depicts an exemplary embodiment for the decomposition of the target voltage rotating phasor into a differential voltage rotating phasor and a modified target voltage rotating phasor when two phases are overloaded.

FIGS. 5 and 6 show different possibilities for the decomposition of the target voltage rotating phasor $V_{target}$ into a differential voltage rotating phasor $V_{diff}$ and a modified target voltage rotating phasor $V_{mod}$ for different overload events.

FIGS. 5 and 6 differ in that in FIG. 5, phase L1 is overloaded with a positive current. FIG. 6 shows the case where phase L1 and phase L2 are overloaded with a positive current. A positive current corresponds in each case to a current in the direction of the arrows on phases L1, L2 and L3 in FIG. 1.

FIG. 5 also shows that modified target voltage rotating phasors $V_{mod}$ can be generated within the parallelogram P. Simple vector addition of the predefined target voltage rotating phasor $V_{target}$ with a differential voltage rotating phasor $V_{diff}$ results in a specific modified target voltage rotating phasor $V_{mod}$, as represented in FIG. 5. $V_{mod}$ can now be generated depending on specifications for the differential voltage rotating phasor $V_{diff}$.

In the event of overload of one phase, it is possible, as FIG. 5 shows, to fully reconstruct the voltage rotating phasors situated within the parallelogram P via the non-overloaded phases L2 and L3 such that the differential voltage rotating phasor $V_{diff}$ can attain the value 0, provided the predefined target voltage rotating phasor $V_{target}$ moves within the parallelogram P.

The same applies also to FIG. 6 in the event that the predefined target voltage rotating phasor $V_{target}$ is exactly on the dashed straight line of the still possible, modified target voltage rotating phasor $V_{mod}$, wherein in this case only one phase L3 can still be switched actively. Due to the two overloaded phases L1 and L2 with positive overload current, in this case it is only possible to set the values along the dashed straight line in FIG. 6 according to the length of the still possible, modified target voltage rotating phasor $V_{mod}$.

As already explained beforehand, the length of the differential voltage rotating phasor $V_{diff}$ i.e. the absolute value of the differential voltage rotating phasor $V_{diff}$, can attain a predetermined value. Thus, according to a further configuration, it is possible to configure the differential voltage rotating phasor $V_{diff}$ to be minimal in length. Thus, in the bridge circuit 1, the closest possible switching state with respect to the switching state predefined by the predefined target voltage values v1, v2, v3 taking into account the non-overloaded phases is set, such that a further improvement of the dynamic control behaviour of the bridge circuit is achieved. For example, the differential voltage rotating phasor $V_{diff}$ can then have the shortest length unequal to zero if the modified target voltage rotating phasor $V_{mod}$ is at right angles to the differential voltage rotating phasor $V_{diff}$ i.e. both vectors form a right angle.

Mathematically, the modified target voltage rotating phasor $V_{mod}$ with the differential voltage rotating phasor $V_{diff}$ with the smallest absolute value can be specified, for example for the target voltage rotating phasor $V_{target}$ predefined in FIG. 5, with:

vmod1=vmax1
vmod2=vmax1
vmod3=vmax1−3valpha/4−(3 √3 vbeta)/4

Valpha and vbeta are thereby the αβ-coordinates of the predefined target voltage rotating phasor $V_{target}$ in the αβ-coordinate system. Vmax1 is the resulting maximum value for the phase voltage, for the circuit according to FIG. 1 and a three-phase grid with symmetric impedances ⅔ VDc.

If the predefined target voltage rotating phasor $V_{target}$ is within the parallelogram P, it can be precisely reconstructed such that the differential voltage rotating phasor $V_{diff}$ has the length zero. The modified target voltage values vmod1, vmod2, vmod3 of the modified target voltage rotating phasor $V_{mod}$ with a differential voltage rotating phasor $V_{diff}$ zero can be specified within the parallelogram with:

vmod1=vmax1
vmod2=(√3 vbeta)/2−3valpha/2+vmax1
vmod3=−(√3 vbeta)/2−3valpha/2+vmax1

In FIG. 6, as already explained, phase 1 and phase 2 are overloaded with a positive current. For the represented predefined target voltage rotating phasor $V_{target}$, this results, for example, in a minimum differential voltage rotating phasor $V_{diff}$ with:

vmod1=vmax1
vmod2=vmax1
vmod3=vmax1−3valpha/4−(3 √3 vbeta)/4

According to an alternative embodiment, the modified target voltage rotating phasor $V_{mod}$ itself can be used in the αβ-coordinate system directly by the control unit 4 to actuate the bridge circuit, provided that the control unit is suitable for this purpose.

The control behaviour of bridge circuit 1 has now been simulated by means of a required reactive current output in the event of a drop in grid voltage, taking into account a vector optimisation in which modified target voltage rotating phasors $V_{mod}$ have been determined with a minimum absolute value of the differential voltage rotating phasor $V_{diff}$. This is a common requirement defined in grid codes by grid operators for grid voltage stabilisation.

Figure 7:
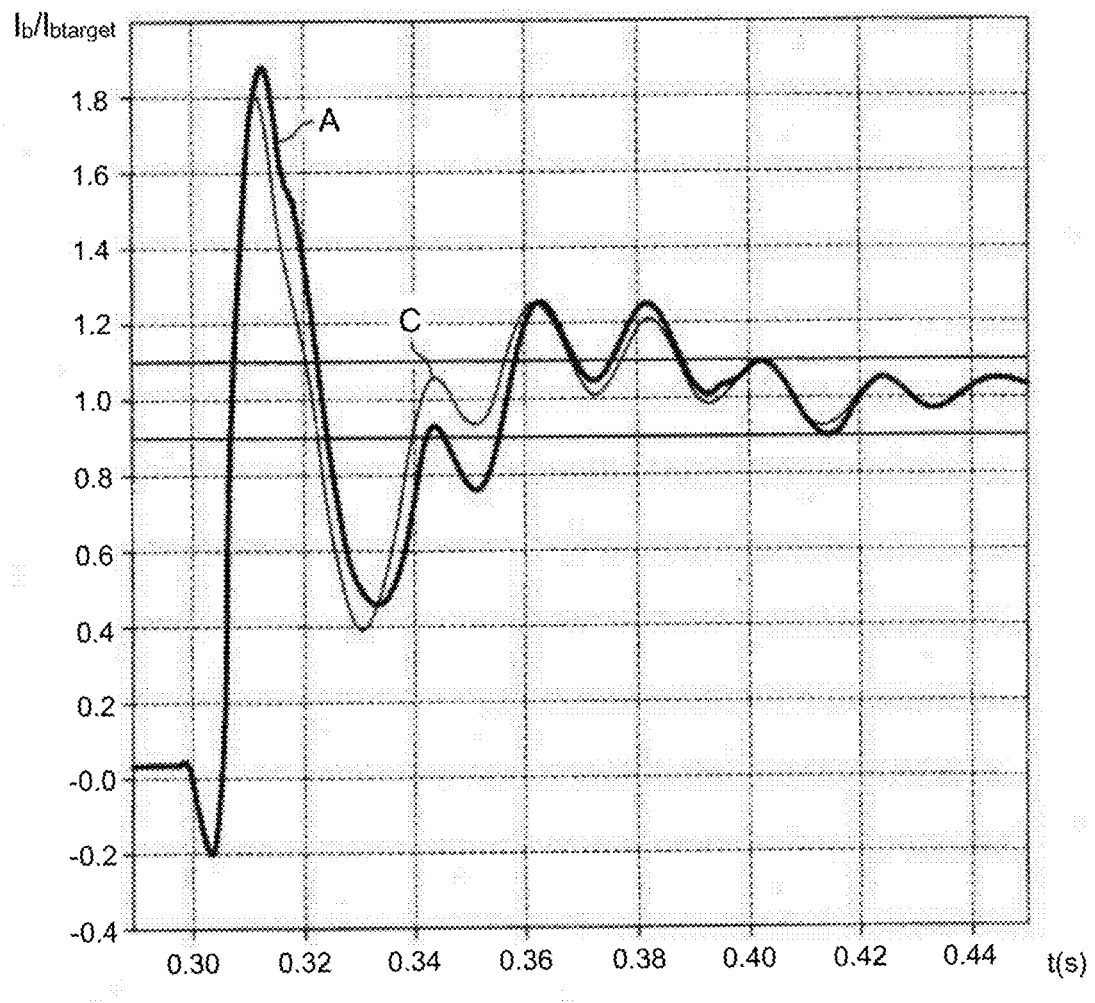
FIG. 7 depicts a diagram of a simulated reactive current output of a three-phase inverter according to an exemplary embodiment of the present invention compared to the reactive current output of an inverter from the prior art with oversized power switches.

FIG. 7 shows the diagram of this simulated reactive current output of the three-phase inverter with cost-optimised IGBT power switches and optimised target voltage rotating phasor specification according to an exemplary embodiment of the invention in curve C. For this purpose, a reactive current output with IGBT power switches, which are dimensioned such that they do not show any overload states in the event of the drop in grid voltage, is represented by comparison (curve A).

As FIG. 7 shows, the method according to the invention is advantageous, in particular for the operation of bridge circuits in three-phase inverters in the case of grid voltage faults, since it enables a particularly fast transient oscillation behaviour to predefined reactive current values without having to thereby oversize the IGBT power switches. As already explained, this allows IGBT power switches that are dimensioned to be 10% to 15% smaller to be used without any losses in control behaviour.

Figure 8:
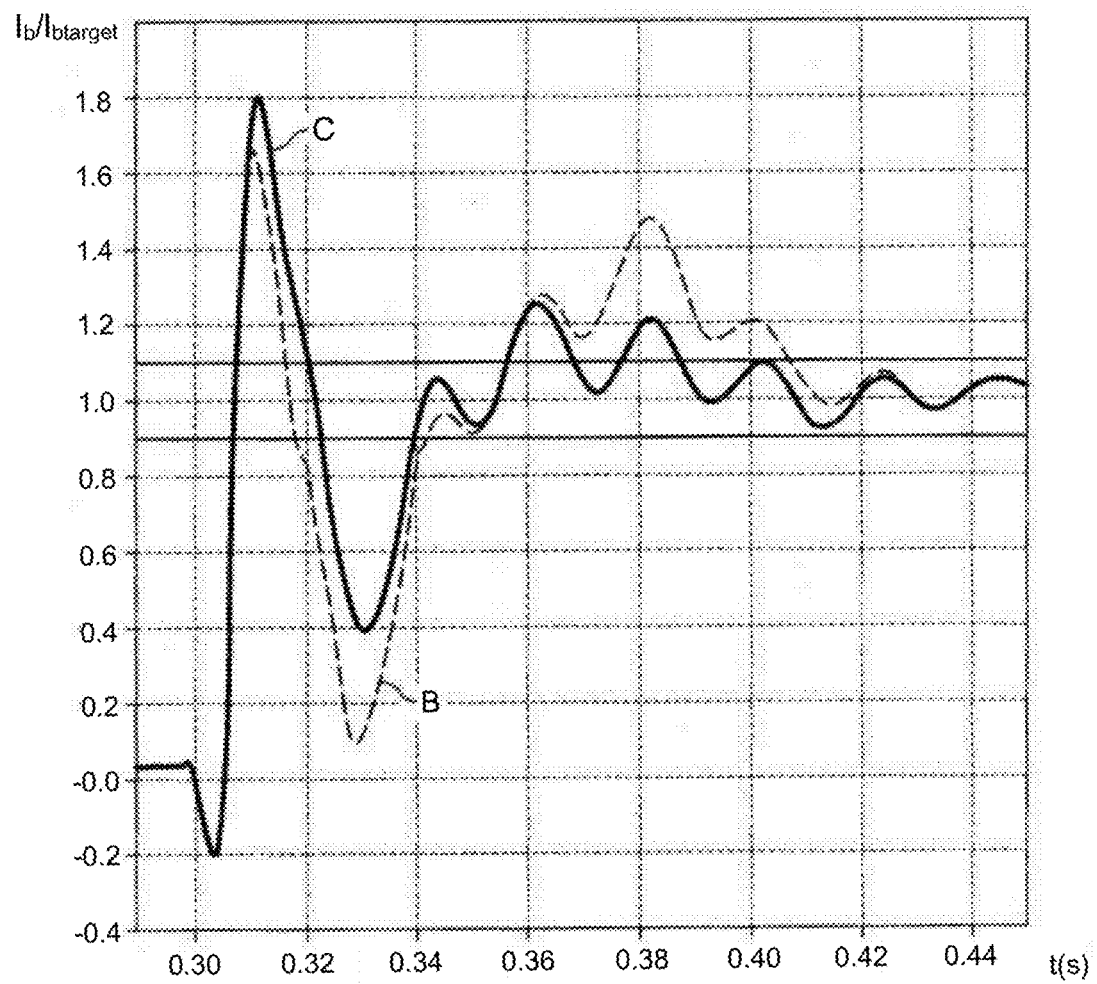
FIG. 8 depicts a diagram of a simulated reactive current output of a three-phase inverter according to an exemplary embodiment of the present invention compared to the reactive current output of an inverter with switching-off of the IGBTs of the bridge circuit according to the prior art.

FIG. 8 shows a comparison of the exemplary embodiment according to the invention with cost-optimised IGBT power switches without applying the method according to the invention, curve B. The method according to the invention leads to a significant improvement in the dynamic control behaviour of the bridge circuit with the same hardware. Curve C of the exemplary embodiment according to the invention already shows after 0.39 s roughly the permanent attainment of the tolerance band for the reactive current output, whereas, as stated at the outset, the variant known from the prior art only reaches the tolerance band at 0.41 seconds.

It is therefore understandable that the method for operating the bridge circuit of a three-phase inverter according to the present invention can be carried out particularly advantageously with devices for generating and feeding electrical energy into an electrical grid, preferably with three-phase inverters of wind power systems. Furthermore, photovoltaic systems with or without a storage device or even battery storage systems themselves, which are connected to the electrical grid, can advantageously be operated as devices for generating and feeding in electrical energy using the method according to the invention and benefit from the resulting cost advantages for the devices. As FIGS. 7 and 8 clearly show, the method according to the invention is primarily advantageous for the fault ride through (FRT) operation of an inverter on the grid.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for operating a three-phase inverter on a three-phase load, in particular on an electrical grid, wherein the three-phase inverter has a direct voltage intermediate circuit, at least one three-phase bridge circuit and at least one control unit for controlling the bridge circuit, wherein, in the at least one bridge circuit, at least two power switches per phase are provided, which are connected in series parallel to the direct voltage intermediate circuit, wherein in the method, depending on predefined target voltage values of the three phases of the inverter, the power switches of each individual phase are actuated via the control unit such that a three-phase alternating voltage is generated on the three-phase load via switching operations of the power switches, wherein a monitoring of the power switches in the individual phases for an overload state is carried out using monitoring means, wherein if an overload state is detected in one or two phases of the three-phase inverter, the bridge circuit continues to be operated with one or two non-overloaded phases at least for the duration of the detected overload state, characterised in that
instead of the predefined target voltage values, modified target voltage values are determined at least for the duration of the overload state, which are used to control the bridge circuit and, in order to determine the modified target voltage values, the predefined target voltage values of the three phases are transformed into a predefined target voltage rotating phasor in the αβ-coordinate system, the target voltage rotating phasor is decomposed into a differential voltage rotating phasor and at least one modified target voltage rotating phasor in the αβ-coordinate system, wherein the at least one modified target voltage rotating phasor in the overloaded phases takes into account in each case the resulting maximum phase voltage and from the modified target voltage rotating phasor in the αβ-coordinate system, the modified target voltage values can be determined.

2. The method according to claim 1, wherein the overload state of a phase is detected by the monitoring means when a predetermined current in the relevant phase or a predetermined temperature of a component, preferably of a power switch or of a freewheeling diode, in the relevant phase is exceeded.

3. The method according to claim 1, wherein during the monitoring of the individual phases of the bridge circuit, the phase voltage resulting during the respective overload is determined and used as a modified target voltage value for the overloaded phase.

4. The method according to claim 1, wherein for at least one non-overloaded phase, modified target voltage values for the at least one non-overloaded phase are determined taking into account the predefined target voltage value for three phases and the modified target voltage values for at least one overloaded phase.

5. The method according to claim 1, wherein alternatively the modified target voltage rotating phasor in the αβ-coordinate system is used by the control unit to actuate the bridge circuit.

6. The method according to claim 1, wherein the absolute value of the differential voltage rotating phasor has a predetermined value.

7. The method according to claim 1, wherein the absolute value of the differential voltage rotating phasor is selected to be as small as possible.

8. The method according to claim 1, wherein the absolute value of the differential voltage rotating phasor at least temporarily has the value zero.

9. The method according to claim 1, wherein IGBTs with at least one freewheeling diode connected in anti-parallel thereto are used as power switches in the bridge circuit.

10. The method according to claim 1, wherein the method is carried out with three-phase inverters of devices for generating and feeding electrical energy into an electrical grid, with three-phase inverters of wind power systems, of photovoltaic systems with or without electrical storage devices or of components for storing electrical energy, in particular of battery storage systems, which are operated on the electrical grid.

11. The method according to claim 1, wherein the method is carried out during a grid voltage fault, preferably in the fault ride through operation of the inverter.

12. A device for generating a three-phase alternating voltage on a three-phase load or on an electrical grid with at least one three-phase inverter and a direct voltage intermediate circuit, wherein the inverter has at least one three-phase bridge circuit and at least one control unit for controlling the bridge circuit, wherein, in the at least one bridge circuit, at least two power switches per phase are provided, which are connected in series parallel to the direct voltage intermediate circuit, wherein the device is configured to actuate the power switches of each individual phase via the control unit depending on predefined target voltage values for all three phases of the inverter such that a three-phase alternating voltage is generated via switching operations of the power switches, in particular for carrying out a method according to claim 1, wherein means for monitoring the power switches in the individual phases for an overload state are provided, which are configured to continue to operate the bridge circuit, if an overload state is detected in one or two phases of the three-phase inverter, with one or two non-overloaded phases at least for the duration of the detected overload state,
characterised in that
the means are configured to determine, instead of the predefined target voltage values, modified target voltage values at least for the duration of the overload state, which are used to control the bridge circuit and the means are also configured, in order to determine the modified target voltage values, to transform the predefined target voltage values of the three phases into a predefined target voltage rotating phasor in the αβ-coordinate system, to decompose the target voltage rotating phasor into a differential voltage rotating phasor and at least one modified target voltage rotating phasor in the αβ-coordinate system, wherein the at least one modified target voltage rotating phasor in the overloaded phases takes into account in each case the resulting maximum phase voltage and from the modified target voltage rotating phasor in the αβ-coordinate system, the modified target voltage values can be determined.

13. The device according to claim 12, wherein the device is a wind power system operated on a grid, a photovoltaic system with or without a storage device or a component operated on the grid for storing electrical energy, in particular a battery storage system.

* * * * *